(12) United States Patent
Ishida et al.

(10) Patent No.: US 6,181,410 B1
(45) Date of Patent: Jan. 30, 2001

(54) OSCILLATING MOTOR, MEASUREMENT DEVICE FOR MEASURING DISTANCE, SPEED OR DIRECTION USING A LASER LIGHT, AND VEHICLE HAVING THE MEASUREMENT DEVICE

(75) Inventors: Takashi Ishida; Shigeru Ohki, both of Mihama-ku (JP)

(73) Assignee: Seiko Instruments Inc. (JP)

( * ) Notice: Under 35 U.S.C. 154(b), the term of this patent shall be extended for 0 days.

(21) Appl. No.: 09/085,677

(22) Filed: May 27, 1998

(30) Foreign Application Priority Data

May 29, 1997 (JP) .................................................. 9-155949
May 29, 1997 (JP) .................................................. 9-155950

(51) Int. Cl.⁷ .............................. G01C 3/08; G01P 3/36; G01P 3/487; G01B 11/26; G05B 4/70
(52) U.S. Cl. ...................... 356/4.01; 318/466; 324/174; 324/179; 356/141.1; 356/28; 388/923
(58) Field of Search ................. 388/923; 356/141.1, 356/4.01, 28, 28.5; 324/174, 179; 318/466

(56) References Cited

U.S. PATENT DOCUMENTS

| | | | |
|---|---|---|---|
| 4,742,332 | * | 5/1988 | Schroeder et al. . |
| 4,849,620 | * | 7/1989 | Guerin et al. . |
| 5,033,845 | * | 7/1991 | Sorimachi et al. . |
| 5,309,212 | * | 5/1994 | Clark . |
| 5,485,009 | * | 1/1996 | Meyzonnetie et al. ............. 356/5.09 |
| 5,751,407 | * | 5/1998 | Yamabuchi ......................... 356/3.05 |
| 5,760,886 | * | 6/1998 | Miyazaki et al. ................... 356/5.01 |
| 5,774,207 | * | 6/1998 | Yoshida et al. ..................... 356/3.09 |
| 5,808,728 | * | 9/1998 | Uehara ............................... 356/5.01 |

FOREIGN PATENT DOCUMENTS

| | | |
|---|---|---|
| 55-62169 | 10/1953 | (JP) . |
| 59-50749 | 3/1984 | (JP) . |
| 203975 | 11/1984 | (JP) . |
| 9-5438 | 1/1987 | (JP) . |
| 62-149258 | 9/1987 | (JP) . |
| 1124008 | 5/1989 | (JP) . |
| 3190546 | 8/1991 | (JP) . |
| 3285192 | 12/1991 | (JP) . |
| 5264734 | 10/1993 | (JP) . |
| 8-62335 | 3/1996 | (JP) . |
| 8275483 | 10/1996 | (JP) . |

* cited by examiner

*Primary Examiner*—Stephen C. Buczinski
(74) *Attorney, Agent, or Firm*—Adams & Wilks

(57) ABSTRACT

A measurement device has a laser light source for irradiating a laser light, a reflecting mirror for reflecting the laser light irradiated from the laser light source in a preselected direction and/or for scanning the laser light within a preselected angle range, and an oscillating motor for driving the reflecting mirror to reflect the laser light in the preselected direction and/or oscillating the reflecting mirror within the preselected angle range to scan the laser light. The oscillating motor has a main shaft for undergoing rotational oscillating movement and for supporting the reflecting mirror for rotational oscillating therewith, a connecting device for removably connecting the reflecting mirror to the main shaft, and a detecting device for detecting a rotation angle of the main shaft. A reflector reflects the laser light reflected and/or scanned by the reflecting mirror. A light receiving element receives the laser light reflected by the reflector. A calculating device calculates at least one of a distance between the light receiving element and the reflector, a moving speed of the reflector, and a moving direction of the reflector in accordance with the laser light irradiated from the laser light source and the laser light received by the light receiving element.

27 Claims, 9 Drawing Sheets

ОSCILLATING MOTOR, MEASUREMENT DEVICE FOR MEASURING DISTANCE, SPEED OR DIRECTION USING A LASER LIGHT, AND VEHICLE HAVING THE MEASUREMENT DEVICE

BACKGROUND OF THE INVENTION

1. Field of the Invention

The present invention relates to a rotation angle controlling motor, and particularly to an oscillating motor in which positional adjustment of the origin of a main shaft can be easily made after the assembly of the motor.

The present invention relates to a measurement device for measuring a distance, a moving speed, or a moving direction by using a laser light, and particularly to a device for measuring a distance, a moving speed, or a moving direction in which the direction of an irradiated laser light and the range of scanning can be easily set, a load to an arithmetic CPU for performing calculation after receiving light is small, and measurement accuracy is high. The present invention also relates to a vehicle having the measurement device.

2. Description of the Related Art

First, a conventional rotation angle controlling motor will be described with reference to an oscillating motor as an example.

FIG. 3 is a schematic structural view showing the inside of a conventional oscillating motor. An oscillating motor 10 is such a motor that a rotation angle of a main shaft 1 can be arbitrarily controlled. Two-pole magnets 7a and 7b are cylindrically fixed to the main shaft 1 in the radial direction. Coil substrates 3a and 3b are disposed around the outer circumferences of the magnets 7a and 7b with an interval of a predetermined distance. Driving coils 5a and 5b are uniformly wound around the coil substrates 3a and 3b (the driving coil 5b is not shown). Rotation angle detecting magnets 11a and 11b for detecting a rotation angle of the main shaft 1 are disposed at the lower portions of the magnets 7a and 7b. A position detecting sensor 9 is disposed at the outer circumference of the rotation angle detecting magnets 11a and 11b with an interval of a predetermined distance.

An operation of this motor will next be described. In FIG. 3, when an electric current is made to flow through the driving coils 5a and 5b, a torque is generated between these driving coils and the magnets 7a and 7b. If an electric current is fixed to a predetermined value, the main shaft 1 stops. If the driving coils 5a and 5b are connected to each other in series and an alternating current is made to flow, it is possible to make the main shaft carry out an oscillating motion within a range of less than 180 degrees.

When the main shaft 1 is oscillated, an output in proportion to the magnetic flux density shown in FIG. 4 can be obtained from the position detecting sensor 9. Thus, if an electric current flown in the driving coil 5 is adjusted so that the output signal from the position detecting sensor 9 is made a predetermined value, it is possible to control the main shaft 1 so as to stop the shaft at a desired position. Further, if a signal from a not-shown oscillator is made an alternating current signal and is inputted into the driving coil 5, it is also possible to control the main shaft so that the main shaft is simply reciprocated within a range of an angle.

In the conventional oscillating motor 10, the position detecting sensor 9 and the rotation angle detecting magnets 11a and 11b are disposed in the inside of a not-shown motor case 15. Thus, the positional adjustment of the origin of the main shaft 1 must be carried out at the time of assembling the oscillating motor 10. This positional adjustment of the origin is carried out such that a reference current is made to flow through the driving coil 5 in the state where the oscillating motor 10 is temporarily assembled, and a deviation of the main shaft 1 from the origin is compensated by, for example, moving the driving coil 5. Thus, the adjustment requires an operation time, and there is a fear that the adjusted position is slightly deviated after the completion of assembly. Besides, there is a fear that the position of a not-shown screw hole for attachment of the motor is deviated from the designed position;, or cable releasing positions of the driving coil 5 and the position detecting sensor 9 are deviated from the designed positions.

A conventional device of measuring a distance by using a laser light will next be described.

There is conventionally a device of measuring a distance between a moving car and the car ahead by using a laser light. This conventional device adopts the following system.

System 1 (not shown):

A laser light source radiates a laser light to a reflector attached to a rear portion of the car ahead, and a light receiving portion receives the reflected light. Here, the reflector is normally disposed at the rear portion of a car or a bicycle to diffusely reflect the light from the headlights of a backward car. Based on the irradiated light and the reflected light, the distance between an objective car and the car ahead is calculated by the operation of a time difference therebetween, a phase difference therebetween, a Doppler effect, a frequency correlation, and the like.

System 2:

As shown in FIG. 6, a link mechanism 33 is attached to a driving portion 32 such as a DC motor or a stepping motor to oscillate a reflecting mirror 17. By this, a laser light is made to perform scanning within a range of a predetermined angle, and the distance between an objective car and the car ahead is calculated by operations.

System 3:

As shown in FIG. 7, a polygon mirror 35 is connectively fixed to a main shaft 34 of a driving portion 32. Then, the main shaft 34 is made to rotate in one direction. A plurality of mirror surfaces 36 are disposed on the outer circumference of the polygon mirror 35. When the mirror surface 36 is rotated, the laser light is made to perform scanning in a range of a predetermined angle.

However, in the above described system 1, since the directivity of a laser light is high, there is a fear that if the car ahead moves either right or left, the detection can not be made. In the system 2, there is a fear that the accuracy of an oscillating angle becomes inferior due to the backlash of the link mechanism 33. Besides, there are defects that since the link mechanism 33 is disposed in addition to the driving portion 32, the volume of the device becomes large, and the device becomes expensive by the cost of the link mechanism 33. In the system 3, sine the polygon mirror is constituted by the plurality of mirror surfaces 36, accuracy between mirror surfaces is required. Further, since the positions of the mirror surfaces 36 are away from the center of the main shaft 34, the position where the laser light is reflected at the mirror surface 36 is moved together with the rotation of the mirror surface 36. Thus, there is a defect that it is necessary to correct the reflected light, and a great deal of calculation is required for the correction, so that a load to an arithmetic CPU is large. Further, there is also a defect that since an arrangement angle of the mirror surface 36 viewed from the center of the main shaft 34 is determined at a constant value, a range of scanning can not be changed.

SUMMARY OF THE INVENTION

The present invention has been made to solve the problems of the prior art described above, and a first object of the present invention is to provide a rotation angle controlling motor in which positional adjustment of the origin of a main shaft can be easily made after the assembly of the motor.

A second object of the present invention is to provide a measurement device of measuring a distance, a moving speed, or a moving direction by using a laser light in which the direction of radiating a laser light and the range of scanning can be easily set, a load to an arithmetic CPU after receiving light can be made small, and the accuracy of measurement is high.

A third object of the present invention is to provide a vehicle having a measurement device according to the present invention.

In order to achieve the above objects, according to a first aspect of the present invention, in a rotation angle controlling motor which is capable of arbitrarily controlling a rotation angle of a main shaft, at least a rotation angle detecting magnet disposed around the outer circumference of the main shaft, connecting means for connecting the rotation angle detecting magnet to the main shaft, and a position detecting sensor fixed to a predetermined position opposite to the rotation angle detecting magnet and for detecting the rotation angle of the main shaft by a magnetic field of the rotation angle detecting magnet, are disposed at the outside of a motor case.

According to a second aspect of the present invention, a measurement device of measuring a distance, a moving speed, or a moving direction by using a laser light, comprises: a laser light source for radiating a laser light; a first reflection portion for reflecting the laser light irradiated from the laser light source in a specified direction or for causing the laser light to scan within a specified angle range with the center in the specified direction; a driving portion including a main shaft with an end connectively fixed to the first reflection portion and for directing the first reflection portion in the specified direction and/or oscillating the first reflection portion within the specified angle range; a second reflection portion for reflecting the laser light reflected in the specified direction or made to scan with the center in the specified direction by the first reflection portion; a light receiving portion for receiving the laser light reflected by the second reflection portion; and arithmetic means for calculating at least one of a distance between the light receiving portion and the second reflection portion, a moving speed of the second reflection portion, or a moving direction of the second reflection portion, based on the laser light received by the light receiving portion and the laser light irradiated from the laser light source.

DETAILED DESCRIPTION OF THE PREFERRED EMBODIMENTS

Preferred embodiments of the present invention will now be described with reference to the accompanying drawings.

<Embodiment of a rotation angle controlling motor>

Figure 1:
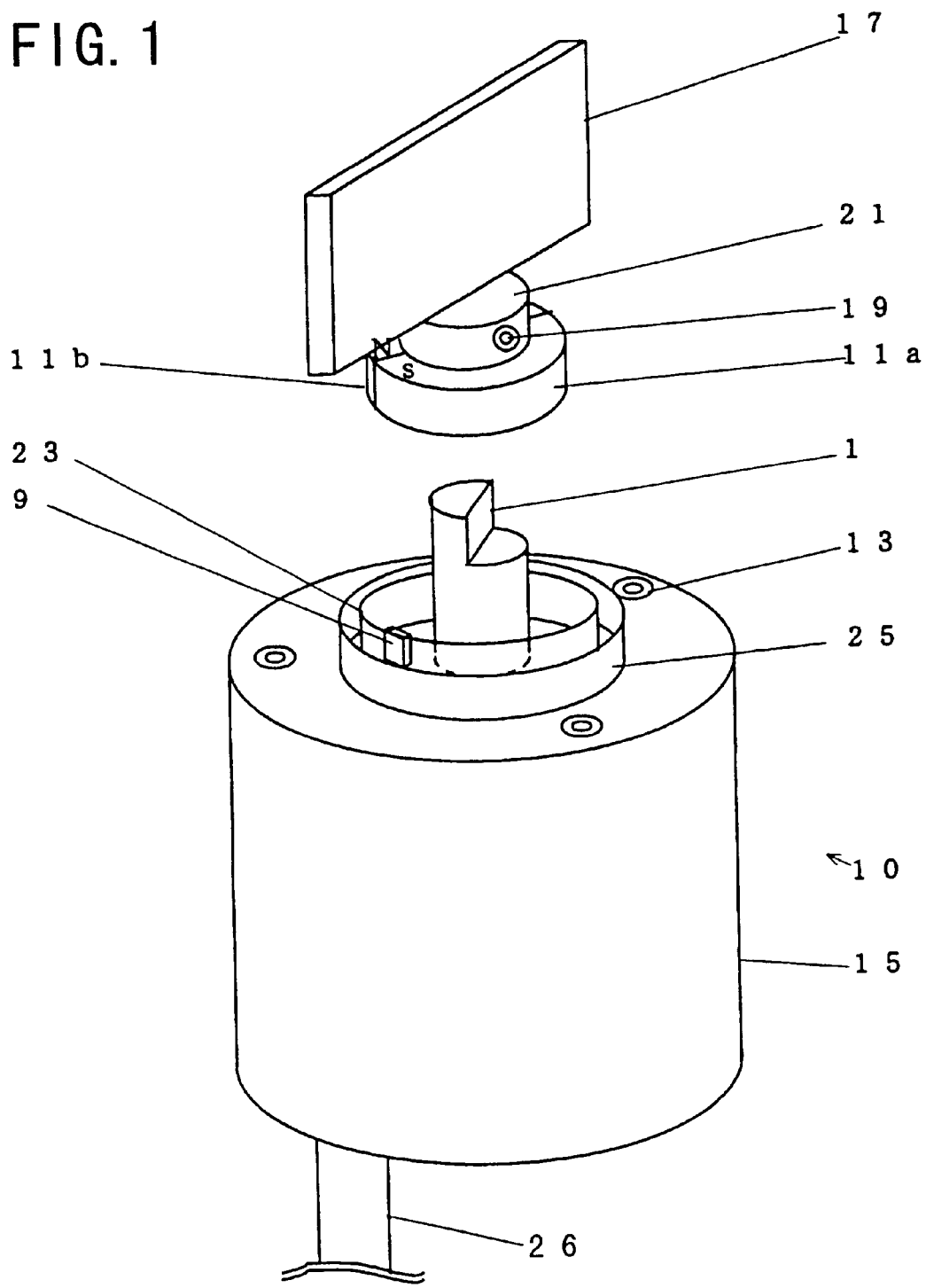
FIG. 1 is a structural view showing a rotation angle controlling motor according to an embodiment of the present invention.

FIG. 1 shows a rotation angle controlling motor according to an embodiment of the present invention. In the inside of a motor case 15 of an oscillating motor 10, similarly to a conventional motor, two-pole magnets (not shown) are cylindrically fixed to the circumference of a main shaft 1 in the radial direction. Coil substrates (not shown) are disposed around the circumferences of the magnets with an interval of a predetermined distance. Driving coils (not shown) are uniformly wound around the coil substrates. Motor attachment screw holes 13 are provided in the motor case 15. A head portion of the main shaft 1 passes through the end of the motor case 15, and the portion of a predetermined length extends to the outside of the motor case 15. A cut portion is provided at the head of the main shaft 1. For example, a reflecting object, such as a reflecting mirror 17, for reflecting a laser light is attached to the head portion of the main shaft 1 through a connecting member or attachment portion 21. The main shaft 1 and the attachment portion 21 are fixed to each other by a set screw 19. Thus, the attachment portion 21 and the set screw 19 constitute fixing means by which the main shaft 1 and the reflecting mirror 17 are connectively fixed to each other. Rotation angle detecting magnets 11a and 11b are cylindrically disposed along the outer circumference of the attachment portion 21. A fixing wall portion 23 of the motor case 15, is disposed around the outer circumference of the rotation angle detecting magnets 11a and 11b with an interval of a predetermined distance, and a position detecting sensor 9 is attached to the fixing wall portion. A magnetic ring 25 for increasing the magnetic flux density of the rotation angle detecting magnets 11a and 11b is disposed around the outer circumference of the fixing wall portion 23 with an interval of a predetermined distance.

The operation of the rotation angle controlling motor will next be described.

The head portion of the main shaft 1 passes through the end portion of the motor case 15, and the head portion of a predetermined length extrudes to the outside. The rotation angle detecting magnets 11a and 11b, the position detecting sensor 9, the attachment portion 21, and the set screw 19 are disposed at the outside of the motor case 15. Since the main shaft 1 and the reflecting mirror 17 are connectively fixed to each other, the reflecting mirror 17 follows the oscillation of the main shaft 1.

Figure 4:
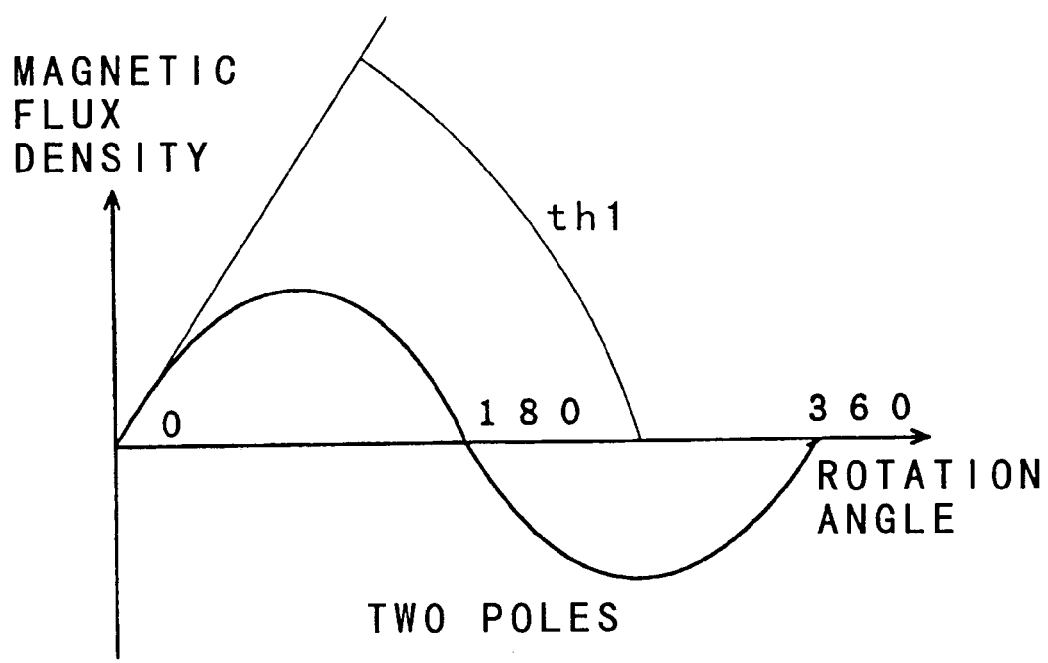
FIG. 4 is a view showing the relation between the rotation angle of the main shaft and the magnetic flux density when the rotation angle detecting magnet of the rotation angle controlling motor of the present invention has two poles.

The positional adjustment of the origin of the main shaft 1 is carried out as follows. First, a reference current is made to flow in the driving coils from a cable 26. At this time, the rotation angle detecting magnets 11a and 11b are in a movable state. The rotation angle detecting magnets 11a and 11b are fixed at the position where the output of the position detecting sensor 9 reaches just the origin. In the case where the rotation angle detecting magnet has two poles, since the output of the position detecting sensor 9 is in proportion to the magnetic flux density shown in FIG. 4, for example, the position where the detected magnetic flux density is zero, is determined to be the position of the origin (angle of zero degree) of the main shaft 1.

Figure 2:
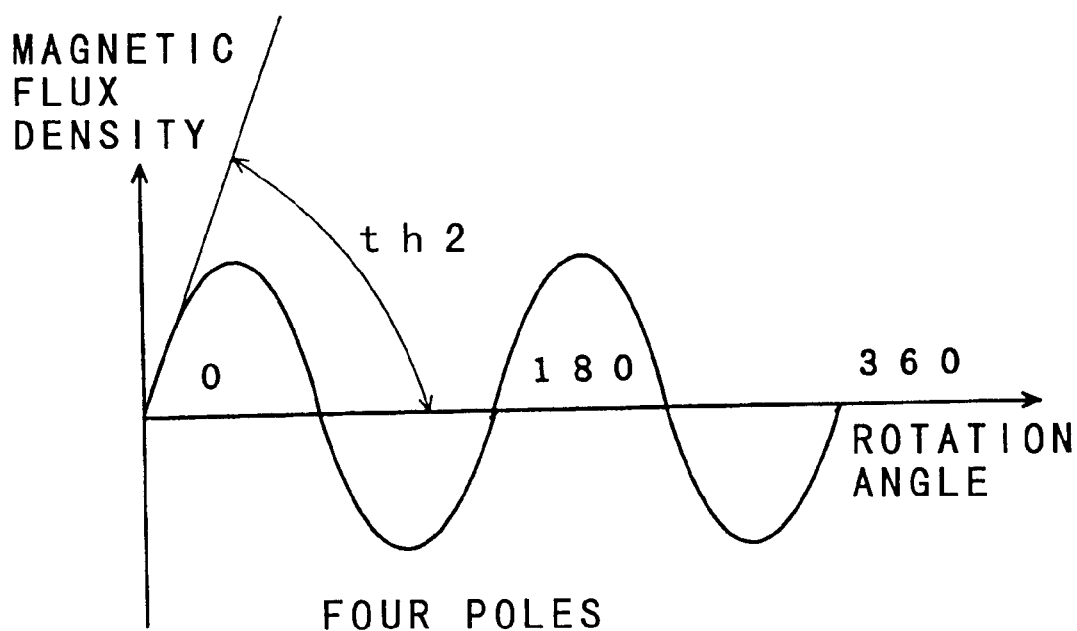
FIG. 2 is a view showing the relation between the rotation angle of a main shaft and the magnetic flux density when the rotation angle detecting magnet of the rotation angle controlling motor of the present invention has four poles.
Figure 3:
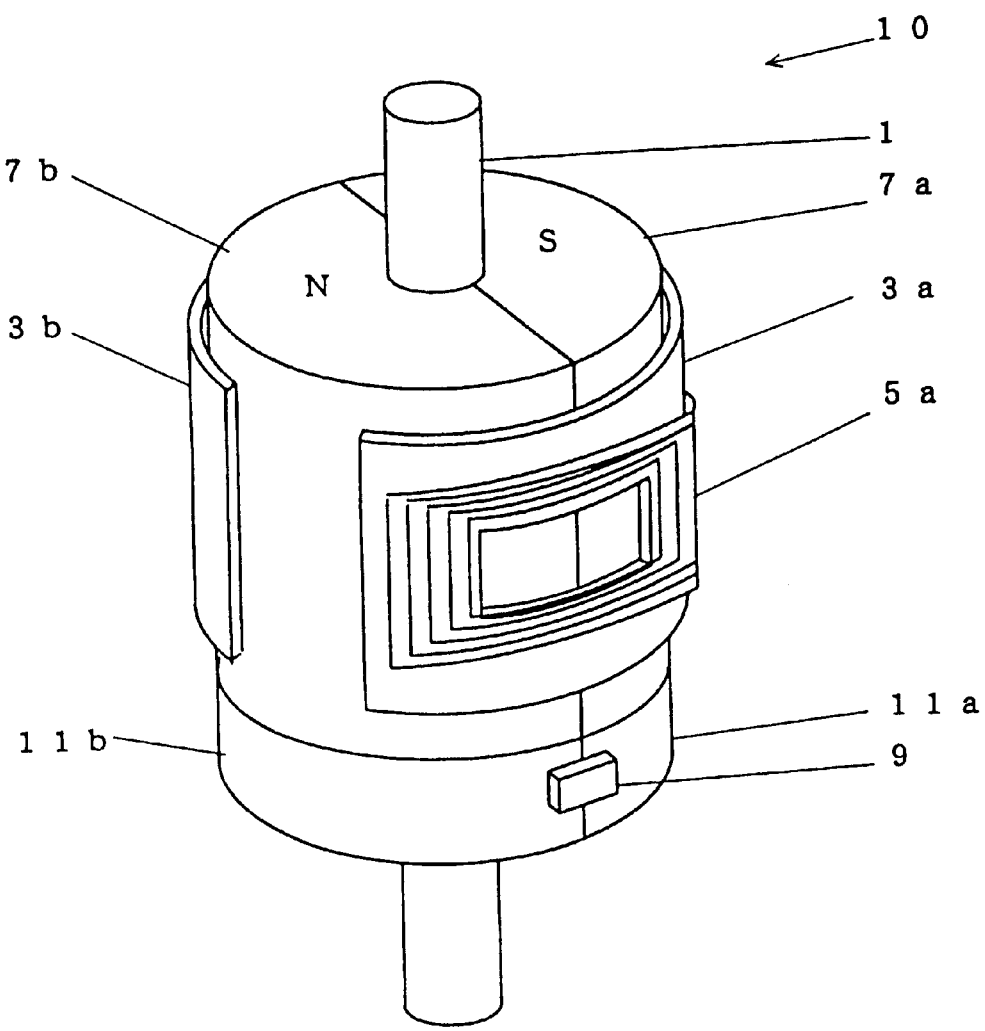
FIG. 3 is a schematic structural view showing the inside of a conventional oscillating motor.

In the rotation angle controlling motor described above, the rotation angle detecting magnets 11a and 11b may be fixed to the attachment portion 21 by an adhesive or by a not-shown screw and the like. The rotation angle detecting magnets 11a and 11b may be fixed to the attachment portion 21, or may be fixed to the main shaft 1. The rotation angle detecting magnet 11 shown in FIG. 4 has two poles. However, since the rotation angle detecting magnet 11 can be easily attached to and detached from the main shaft 1 or the attachment portion 21, the magnetic flux density or the number of poles can be easily changed. For example, as shown in FIG. 2, if the number of poles is increased into four, the rate of variation (th2) of the magnetic flux density per a rotation angle becomes large. Also in the case where a magnet having high magnetic flux density is used for the rotation angle detecting magnet 11, the rate of variation (th2) of the magnetic flux density per a rotation angle becomes large. If the rate of variation of the magnetic flux density per a rotation angle becomes large, the detection accuracy and resolution of the rotation angle of the main shaft 1 can be improved.

<Embodiment of a device for measuring a distance, a moving speed, or a moving direction using a laser light>

Figure 5:
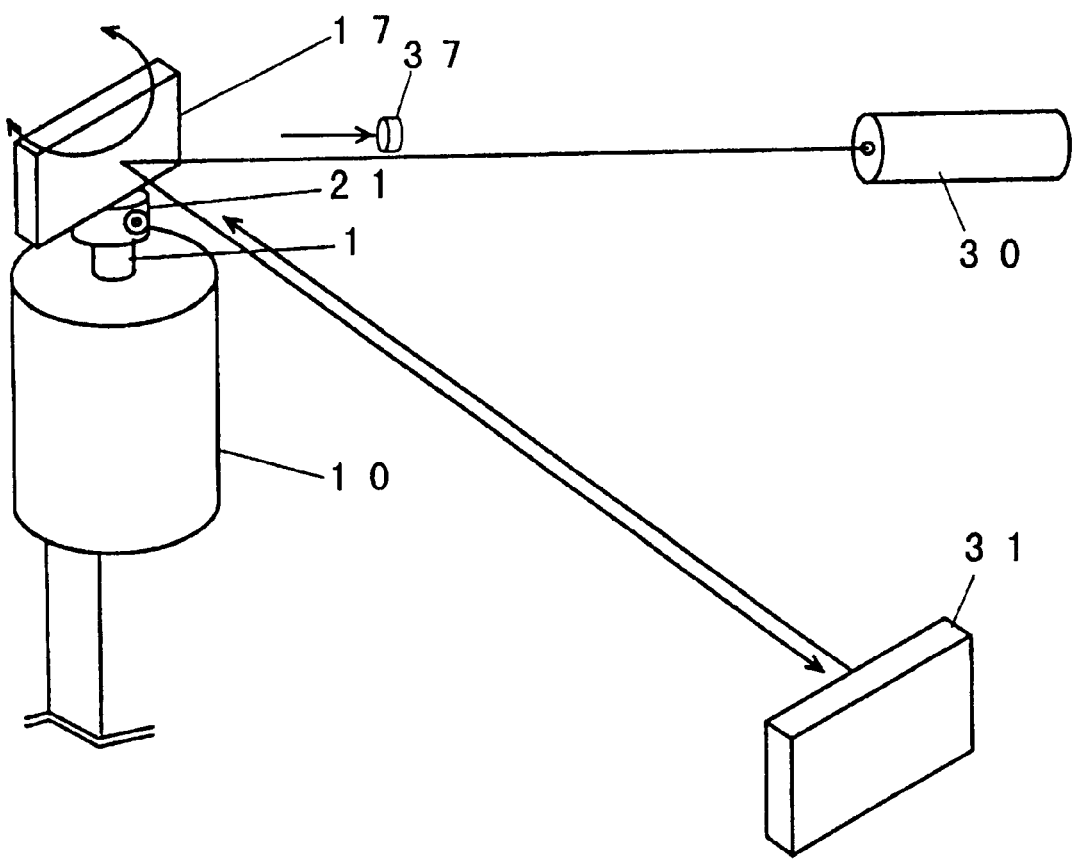
FIG. 5 is a structural view showing the whole of a device for measuring a distance, a moving speed, or a moving direction by using a laser light according to an embodiment of the present invention.
Figure 6:
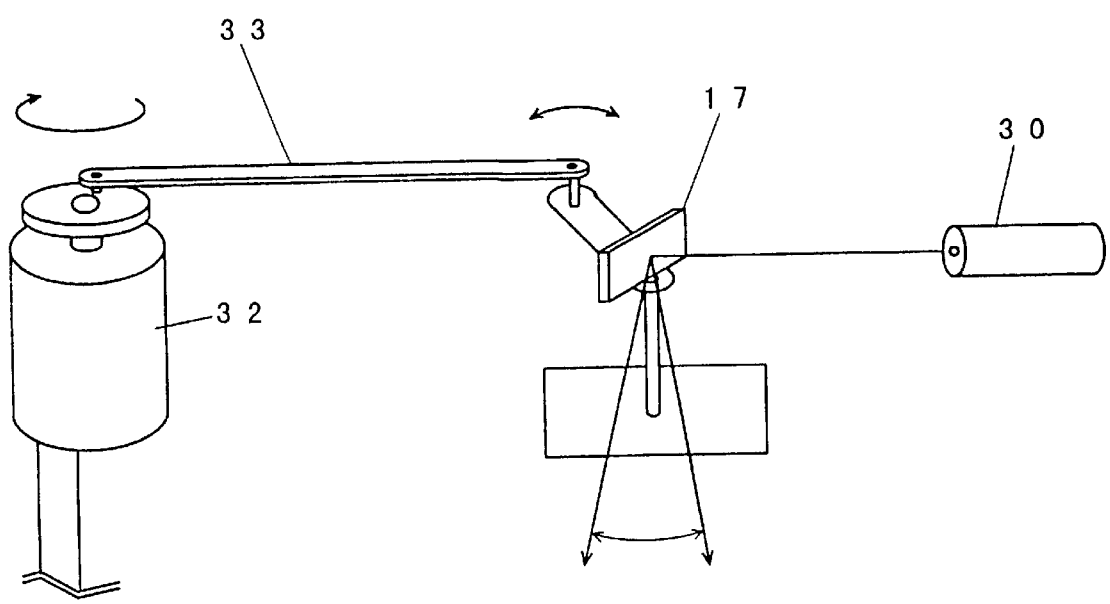
FIG. 6 is a schematic structural view showing a conventional device for measuring a distance between two cars by using a laser light.
Figure 7:
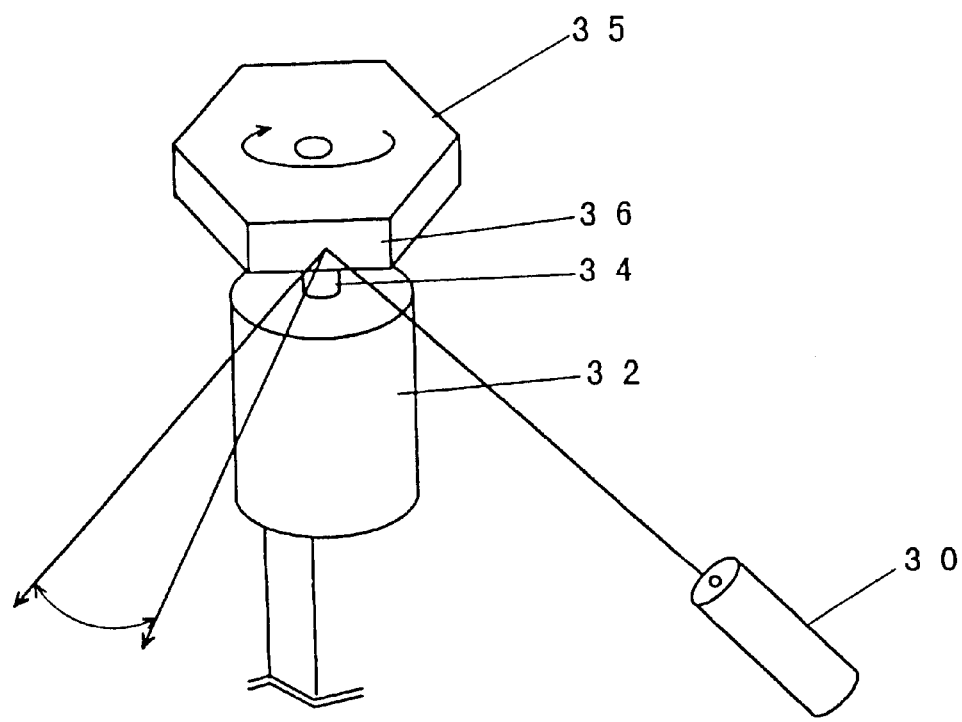
FIG. 7 is a schematic structural view showing another conventional device for measuring a distance between two cars using a laser light.
Figure 8:
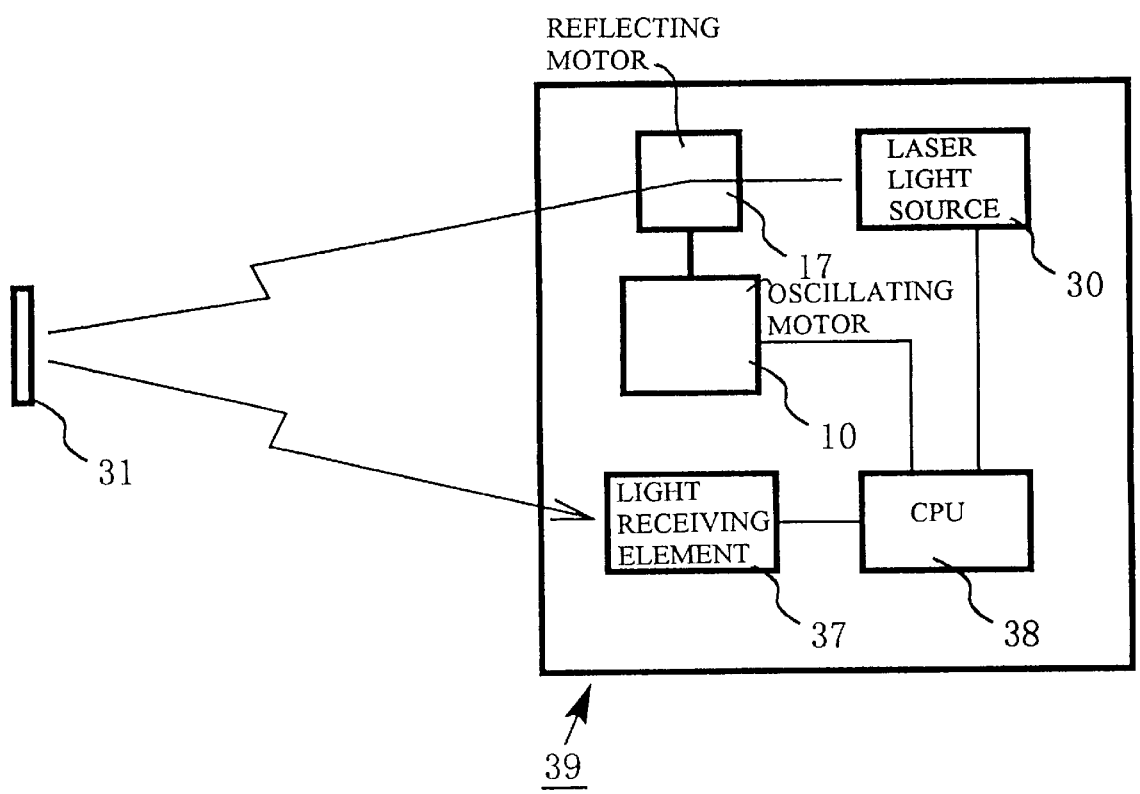
FIG. 8 is a block diagram of a device for measuring a distance, a moving speed, or a moving direction by using a laser light according to an embodiment of the present invention.
Figure 9:
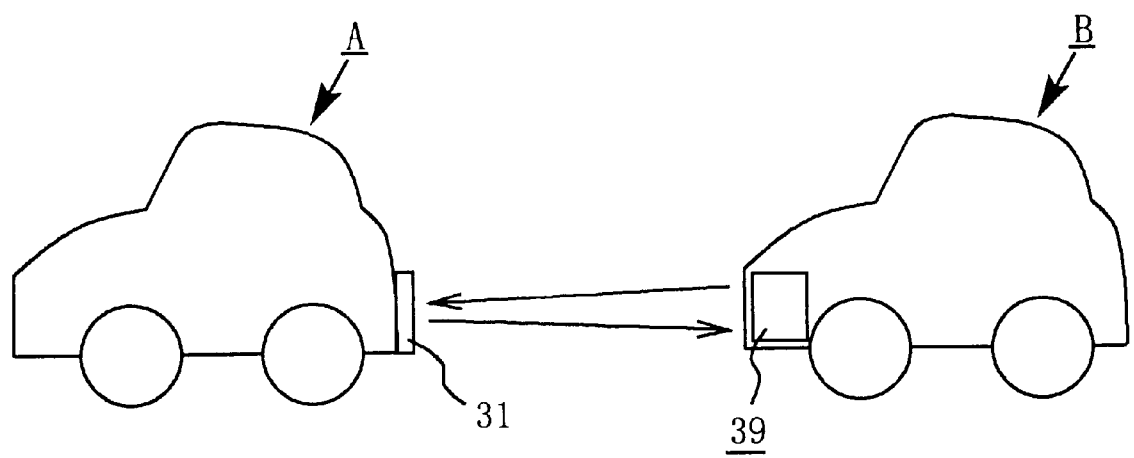
FIG. 9 is an explanatory drawing of a car having a device for measuring a distance, a moving speed, or a moving direction by using a laser light according to an embodiment of the present invention.

FIG. 5 is a view showing a measurement device for measuring a distance, a moving speed, or a moving direction by using a laser light according to an embodiment of the present invention. FIG. 8 is a block diagram of a device for measuring a distance, a moving speed, or a moving direction by using a laser light according to an embodiment of the present invention, and FIG. 9 is an explanatory drawing of a vehicle, such as a car, having a measurement divide for measuring a distance, a moving speed, or a moving direction by using a laser light according to an embodiment of the present invention.

An oscillating motor 10 is a motor capable of arbitrarily controlling a rotation angle of a main shaft 1. A reflecting mirror 17 is connectively fixed to the end portion of the main shaft 1 through an attachment portion 21. A reflector 31 is fixed to the rear portion of a car A shown in FIG. 9. A light receiving portion 37 is disposed in the vicinity of the reflecting mirror 17. In FIG. 8, a main unit 39 is constructed of a laser light source 30, the reflecting mirror 17, the oscillating motor 10, the light receiving element or portion 37, and a CPU 38. The main unit 39 is mounted on on a front portion of a car B shown in FIG. 9. The oscillating motor 10 specifies the reflection angle of the reflecting mirror 17 or oscillates the reflecting mirror 17 to make scanning of the reflected light. The reflected light reflected by the reflecting mirror 13 is made to reach the reflector 31.

The operation of this device will next be described. The end portion of the main shaft 1 of the oscillating motor 10 is connectively fixed to the reflecting mirror 13 through the attachment portion 21. Thus, the reflecting mirror 17 follows the movement of the main shaft 1. A laser light irradiated from the laser light source 30 is applied to the center of the reflecting mirror 17 or to the extension line of the center of the main shaft 1. The laser light is reflected by the reflecting mirror 17 an is applied in a specified direction. If the position of the reflector 31, that is, the position of the car A is fixed, the laser light applied in the direction is reflected by the reflector 31. However, if the position of the reflector 31 is unknown, the main shaft 1 of the oscillating motor 10 is oscillated, and the reflecting mirror 17 is rotated by a predetermined angle, so that the laser light is made scanning. In this way, the laser light applied to the reflector 31 is reflected by the reflector 31, and is detected by the light receiving portion 37.

Based on the time difference, phase difference, wavelength difference, and the like between the laser light irradiated from the laser light source 30 and the laser light received by the light receiving portion 37, the distance between the light receiving portion 37 and the reflector 31 is calculated by a CPU 38 constituting calculating means. In this way, if the reflector 31 exists within the range of scanning, the distance between the receiving portion 37 and the car A ahead to which the reflector 31 is attached, the moving speed of the car ahead, he moving direction of the car ahead, and the like can be calculated. If operation correction of a distance and an angle is applied to the laser light detected by the light receiving portion 37, the disposed position of the light receiving portion 37 can be freely set, and for example, the light receiving portion 37 can also be set in the vicinity of the laser light source 30 or at other arbitrary position.

According to the measurement device for measuring the distance, the moving speed, or the moving direction by using the laser light according to the present invention, since a link mechanism is not provided, the angle adjustment accuracy and resolution of the reflecting mirror 17 can be improved. Further, since the reflected position is not apart form the position of the main shaft, calculation of the reflected light can be easily made, and the load to the arithmetic CPU 38 can be made small. The scanning range and specified direction of the laser light can also be arbitrarily set.

Incidentally, the reflecting mirror 17 may be changed to a crystal or the like which can polarize a light beam. Further, the laser light source 30 may be directly attached to the attachment portion 21 instead of the reflecting mirror 17.

As described above, according to the rotation angle controlling motor of the present invention, since at least the rotation angle detecting magnet, the connecting means for connecting fixing the rotation angle detecting magnet, and the position detecting sensor are disposed at the outside of the motor case, the positional adjustment of the origin of the main shaft can be easily carried out even after the assembly of the motor. Moreover, the respective mechanisms of the motor do not deviate from the designed positions after the positional adjustment of the origin. The adjusted position is easily and accurately determined, and an operation time can be lessened. Further, since the rotation angle detecting magnet can be easily attached to and detached from the main shaft, the magnetic flux density and the number of poles can be easily changed. Thus, the detection accuracy and resolution of the rotation angle of the main shaft can be variously changed. Especially, in the case where the magnetic flux density or resolution of the rotation angle detecting magnet is increased, the detection accuracy and resolution of the rotation angle of the main shaft can be improved.

Moreover, according to the device for measuring the distance, the moving speed, or the moving direction by using the laser light, since the end portion of the main shaft of the driving portion is connectively fixed to the first reflection portion, the specified direction and scanning range of the irradiated laser light can be easily set, the load to the arithmetic CPU after receiving light can be made small, and the measurement accuracy can be improved.

What is claimed is:

1. An oscillating motor comprising: a main shaft for undergoing rotational oscillating movement; an object mounted on the main shaft for rotational oscillation therewith; connecting means for removably connecting the object to the main shaft; and detecting means for detecting a rotation angle of the main shaft; wherein the detecting means comprises a rotation angle detecting magnet connected to the main shaft, and a position detecting sensor disposed in spaced-part relation to the rotation angle detecting magnet.

2. An oscillating motor according to claim 1; wherein the connecting means comprises a connecting member for connecting the object and the rotation angle detecting magnet to one another to form an integral unit, and means for connecting the integral unit to the main shaft.

3. An oscillating motor according to claim 2; wherein the main shaft has an end portion for direct connection to the connecting member.

4. An oscillating motor according to claim 3; wherein the means for connecting the integral unit to the main shaft comprises a threaded element and a threaded hole extending through the connecting member for receiving the threaded element.

5. An oscillating motor according to claim 2; further comprising a motor case having a wall portion supporting the position detecting sensor; and wherein the wall portion of the motor case is disposed around an outer circumference of the rotation angle detecting magnet when the integral unit is connected to the main shaft.

6. An oscillating motor according to claim 5; further comprising a magnetic ring for increasing a magnetic flux density of the rotation angle detecting magnet.

7. An oscillating motor according to claim 6; wherein the magnetic ring is disposed on the motor case and around an outer circumference of the wall portion of the motor case.

8. An oscillating motor according to claim 1; further comprising a motor case having a wall portion supporting the position detecting sensor; wherein the wall portion of the motor case is disposed around an outer circumference of the rotation angle detecting magnet when the integral unit is connected to the main shaft.

9. An oscillating motor according to claim 8; further comprising a magnetic ring for increasing a magnetic flux density of the rotation angle detecting magnet.

10. An oscillating motor according to claim 9; wherein the magnetic ring is disposed on the motor case and around an outer circumference of the wall portion of the motor case.

11. An oscillating motor comprising: a main shaft for undergoing rotational oscillating movement; a motor case for supporting the main shaft for undergoing rotational oscillating movement; an object mounted on the main shaft for rotational oscillation therewith; connecting means for removably connecting the object to the main shaft; and detecting means for detecting a rotation angle of the main shaft and comprised of a magnet connected to the main shaft, and a position detecting sensor disposed in spaced-part relation to the magnet; wherein the object, the connecting means and the detecting means are disposed exteriorly of the motor case.

12. An oscillating motor according to claim 11; wherein the connecting means comprises a connecting member for connecting the object and the magnet to one another to form an integral unit, and means for connecting the integral unit to the main shaft.

13. An oscillating motor according to claim 12; wherein the main shaft has an end portion extending to the exterior of the motor case for direct connection to the connecting member.

14. An oscillating motor according to claim 12; wherein the motor case has a wall portion supporting the position detecting sensor; and wherein the wall portion of the motor case is disposed around an outer circumference of the magnet when the integral unit is connected to the main shaft.

15. An oscillating motor according to claim 14; further comprising a magnetic ring for increasing a magnetic flux density of the magnet.

16. An oscillating motor according to claim 15; wherein the magnetic ring is disposed on the motor case and around an outer circumference of the wall portion of the motor case.

17. An oscillation motor comprising: a main shaft for undergoing rotational oscillating movement; an object mounted on the main shaft for rotational oscillation therewith; a magnet connected to the main shaft and a position detecting sensor disposed in spaced-part relation to the magnet and coacting therewith for detecting a rotation angle of the main shaft; and connecting means for connecting the object and the magnet to one another to form an integral unit and for connecting the integral unit to the main shaft.

18. An oscillating motor according to claim 17; further comprising a motor case for supporting the main shaft for undergoing rotational oscillating movement; and wherein the object, the connecting means, the magnet and the position detecting sensor are disposed exteriorly of the motor case.

19. An oscillating motor according to claim 18; wherein the motor case has a wall portion supporting the position detecting sensor; and wherein the wall portion of the motor case is disposed around an outer circumference of the magnet when the integral unit is connected to the main shaft.

20. An oscillating motor according to claim 19; further comprising a magnetic ring for increasing a magnetic flux density of the magnet.

21. An oscillating motor according to claim 20; wherein the magnetic ring is disposed on the motor case and around an outer circumference of the wall portion of the motor case.

22. A measurement device comprising: a laser light source for irradiating a laser light; a reflecting mirror for reflecting the laser light irradiated from the laser light source in a preselected direction and/or for scanning the laser light within a preselected angle range; an oscillating motor for driving the reflecting mirror to reflect the laser light in the preselected direction and/or oscillating the reflecting mirror within the preselected angle range to scan the laser light, the oscillating motor having a main shaft for undergoing rotational oscillating movement, connecting means for removably connecting the reflecting mirror to an end portion of the main shaft, and detecting means for detecting a rotation angle of the main shaft and comprised of a magnet connected to the main shaft and a position detecting sensor disposed in spaced-part relation to the magnet; a reflector for reflecting the laser light reflected and/or scanned by the reflecting mirror; a light receiving element for receiving the laser light reflected by the reflector; and calculating means for calculating at least one of a distance between the light receiving element and the reflector, a moving speed of the reflector, and a moving direction of the reflector in accordance with the laser light irradiated from the laser light source and the laser light received by the light receiving element.

23. A measurement device according to claim 22; wherein the connecting means comprises a connecting member for connecting the reflecting mirror and the magnet to one another to form an integral unit, and means for connecting the integral unit to the main shaft.

24. A measurement device according to claim 23; wherein the means for connecting the integral unit to the main shaft comprises a threaded element and a threaded hole extending through the connecting member for receiving the threaded element.

25. A measurement device according to claim 23; further comprising a motor case having a wall portion supporting the position detecting sensor; and wherein the wall portion of the motor case is disposed around an outer circumference of the magnet when the integral unit is connected to the main shaft.

26. A measurement device according to claim 25; further comprising a magnetic ring for increasing a magnetic flux density of the magnet.

27. A measurement device according to claim 26; wherein the magnetic ring is disposed on the motor case and around an outer circumference of the wall portion of the motor case.

* * * * *